United States Patent [19]
Bedocs

[11] Patent Number: 5,498,931
[45] Date of Patent: Mar. 12, 1996

[54] METHOD FOR AUTOMATIC SWITCHING AND CONTROL OF LIGHTING

[75] Inventor: Lou Bedocs, Hertfordshire, England

[73] Assignee: TLG plc, Borehamwood, England

[21] Appl. No.: 316,963

[22] Filed: Oct. 3, 1994

Related U.S. Application Data

[63] Continuation-in-part of Ser. No. 899,598, Jun. 18, 1992, abandoned, which is a continuation of Ser. No. 668,269, Mar. 11, 1991, abandoned.

[30] Foreign Application Priority Data

Mar. 10, 1990 [GB] United Kingdom ............. 9005454

[51] Int. Cl.$^6$ ............................................. H05B 37/02
[52] U.S. Cl. ................... 315/158; 307/117; 315/159; 250/214 R
[58] Field of Search ................... 315/159, 156, 315/155, 158, 307; 250/211; 307/117

[56] References Cited

U.S. PATENT DOCUMENTS

| | | | |
|---|---|---|---|
| 4,225,808 | 9/1980 | Saraceni | 315/307 |
| 4,236,101 | 11/1980 | Luchaco | 315/156 |
| 4,368,406 | 1/1983 | Kruzich et al. | 315/156 |
| 4,417,179 | 11/1983 | Fujimura et al. | 315/156 |
| 4,461,977 | 7/1984 | Pierpoint et al. | 315/159 |
| 4,663,521 | 5/1987 | Maile | 250/221 |
| 4,697,122 | 9/1987 | Hoffer | 315/156 |
| 4,701,669 | 10/1987 | Head et al. | 315/155 |
| 4,703,171 | 10/1987 | Kahl et al. | 250/221 |
| 4,751,433 | 6/1988 | Baccanelli | 315/158 |
| 4,823,051 | 4/1989 | Young | 315/155 |
| 4,843,283 | 6/1989 | Chen | 315/159 |
| 4,873,469 | 10/1989 | Young et al. | 315/159 |
| 4,874,989 | 10/1989 | Nilssen | 315/158 |
| 5,015,994 | 5/1991 | Hoberman et al. | 340/567 |

FOREIGN PATENT DOCUMENTS

| | | |
|---|---|---|
| 2187902 | 9/1987 | United Kingdom . |
| 2218506 | 11/1989 | United Kingdom . |

*Primary Examiner*—Robert J. Pascal
*Assistant Examiner*—Michael Shingleton
*Attorney, Agent, or Firm*—Keck, Mahin & Cate

[57] ABSTRACT

The invention relates to a method for automatic switching and control of lighting to a localized area, the switching of the lighting being dependent on the presence or absence of a person in that localized area and the control of the lighting intensity being dependent on the sensed background level of lighting in that localized area. The invention also relates to a lamp fitting and to an automatic control device for controlling the light output of a light source in a "self managed" and "self controlled" energy saving luminaire.

44 Claims, 7 Drawing Sheets

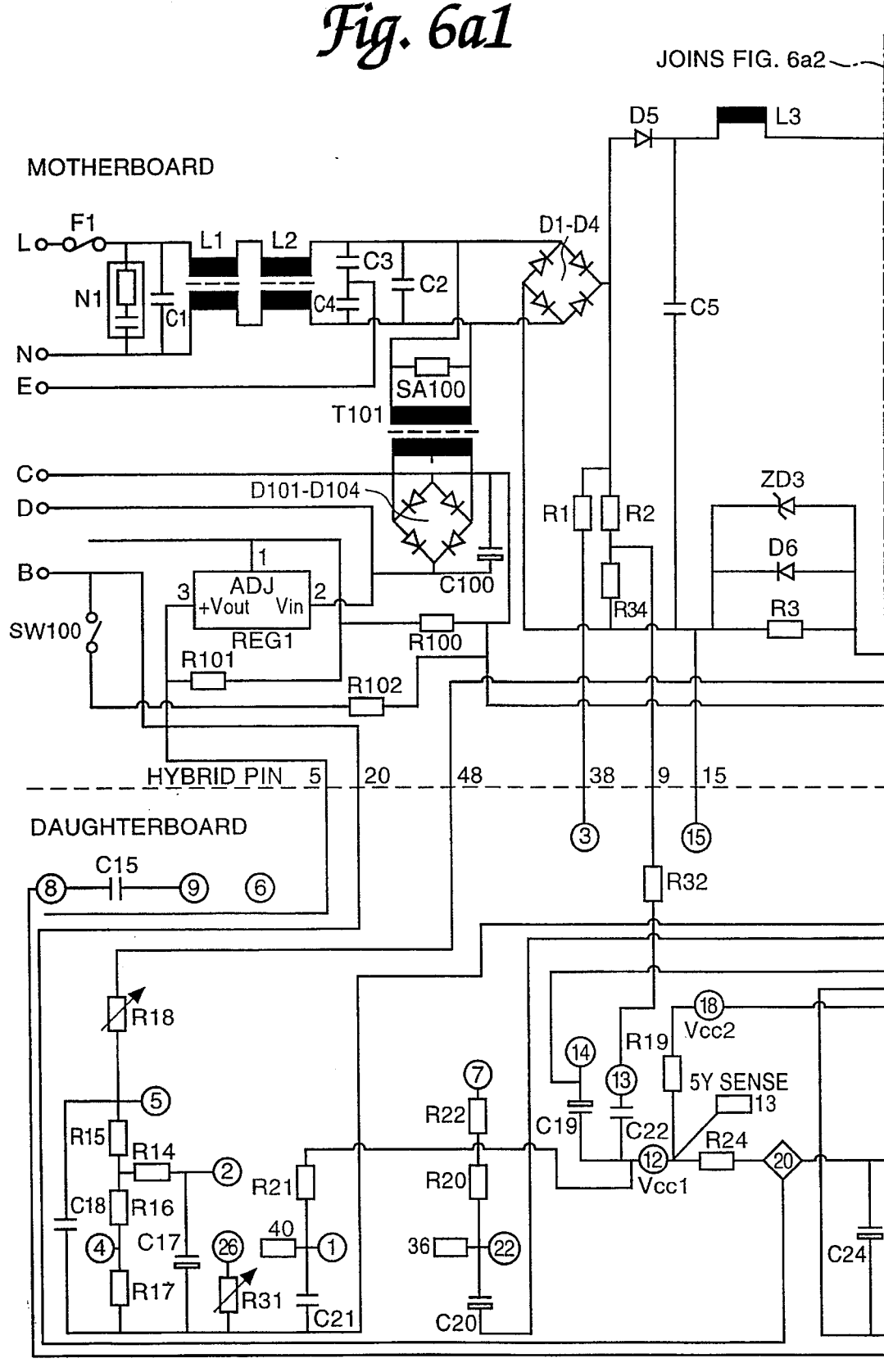
Fig. 6a1

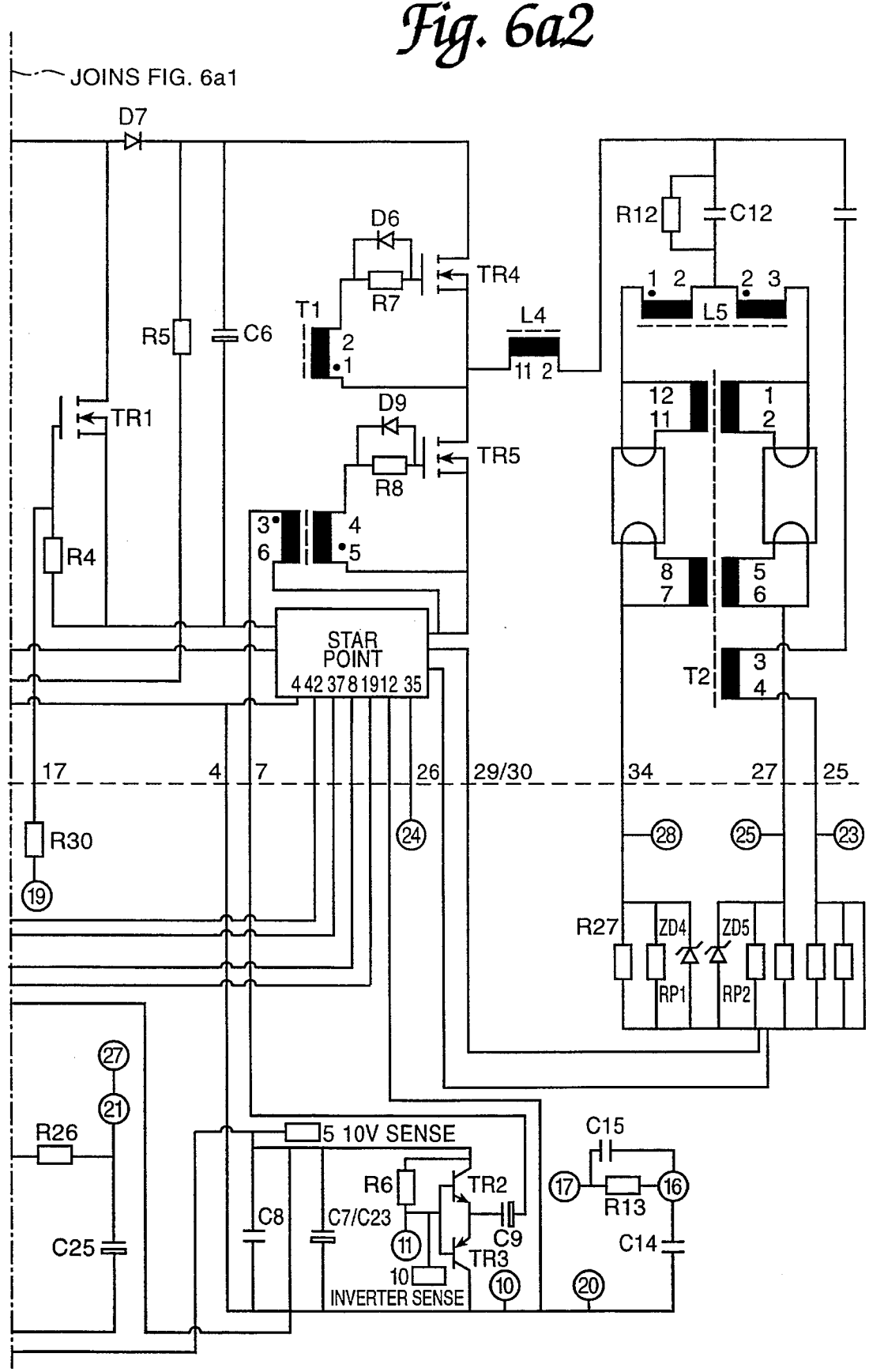
Fig. 6a2

METHOD FOR AUTOMATIC SWITCHING AND CONTROL OF LIGHTING

This application is a continuation-in-part of application Ser. No. 07/899,598, filed on Jun. 18, 1992, now abandoned, which is a Rule 62 continuation of Ser. No. 07/668,269 filed on Mar. 11, 1991, now abandoned.

The present invention relates to a method for automatic switching and control of lighting to a localized area, the switching of the lighting being dependent on the presence or absence of a person in that localized area and the control of the lighting intensity being dependent on the sensed background level of lighting in that localized area. More particular, but not exclusively, the invention relates to a lamp fitting and to an automatic control device for controlling the light output of a light source in a "self managed" and "self contained" energy saving luminaire.

It is known to provide control devices for controlling the lighting conditions in a room as a function of the intensity of the daylight entering that room. Such devices operate with a controllable current supply to all the lights in a room, the current supply being varied in dependence on the sensed intensity of the daylight. Whereas such devices achieve a saving of energy, the actual energy saved is limited by the centralized control of the lights many of which may be illuminating a localized area without anyone being present in that area.

Alternative control devices are available which make use of infra-red detections to detect the presence of a human being within a given locality. These alternative devices work on the principle that the detection of the presence provides a signal which switches on internal or external lighting thereby providing a form of home or office crime protection. They do not, however, control the intensity of the light emanating from the light source in dependence of background lighting within the home or office as their primary function is crime prevention as opposed to providing a control system for saving energy.

One object of the present invention is to provide a method for automatic control of lighting to a localized area which strives to provide an optimized energy saving by ensuring that the correct amount of lighting is provided to that area for specific requirements.

Accordingly, the present invention provides a method of controlling the illumination to a localized area using a light source associated with that localized area, including maintaining the light source in a first condition to provide a dark or dim background lighting to that localized area, sensing the presence of a person in that localized area, switching the light source automatically to a second condition to increase the lighting from the dark or dim background level initially provided to a level of greater intensity upon the sensing, sensing the departure of the person from the localized area, and returning automatically the light source to its first condition upon the sensing of the departure, characterized by sensing the light intensity in the localized area during the detected presence and switching the light source automatically into one or more further conditions to vary the lighting in dependence on the intensity of light sensed in the localized area during the presence of the person in the localized area.

The present invention also provides an automatic control device for controlling the light output from a light source, including a presence detecting means and a light detecting means for detecting respectively the presence of a human being and the level of light intensity in a localized area, control means responsive to a presence detection signal received from said presence detecting means for increasing the intensity of light emanating from the light source, characterized in that said control means is also responsive to a light detecting signal from said light detecting means for varying the light intensity emanating from the light source in dependence on the intensity of light detected by said light detecting means when said presence detecting means has detected the presence of a human being.

Another aspect of the invention is the provision of a lamp fitting incorporating a light source and an automatic control device for controlling the light output from the light source, characterized in that the automatic control device includes a presence detector for detecting the presence of a person in a localized area and a light detector for detecting the level of light intensity in the localized area, and further characterized by control means for varying the light intensity from the light source between first and second intensity levels in dependence on a signal from the presence detector indicative of the presence of the person in the localized area, said control means being responsive to a signal from the light detector indicative of the sensed light intensity in the localized area to control the light source to at least one further intensity level lying between the first and second intensity levels to maintain a minimum light intensity in the localized area.

In a preferred embodiment of the lamp fitting, the light source is connected to a dimmable electronic ballast, the ballast providing the power to drive the presence detector and the light detector. Conveniently, the presence detector is a passive infra-red detection device and the light detector is a photoresponsive device.

The invention will be described further, by way of example, with reference to the accompanying drawings in which:

FIGS. 6a and 6b illustrate the detailed circuits incorporated in the fitting.

Figure 1:
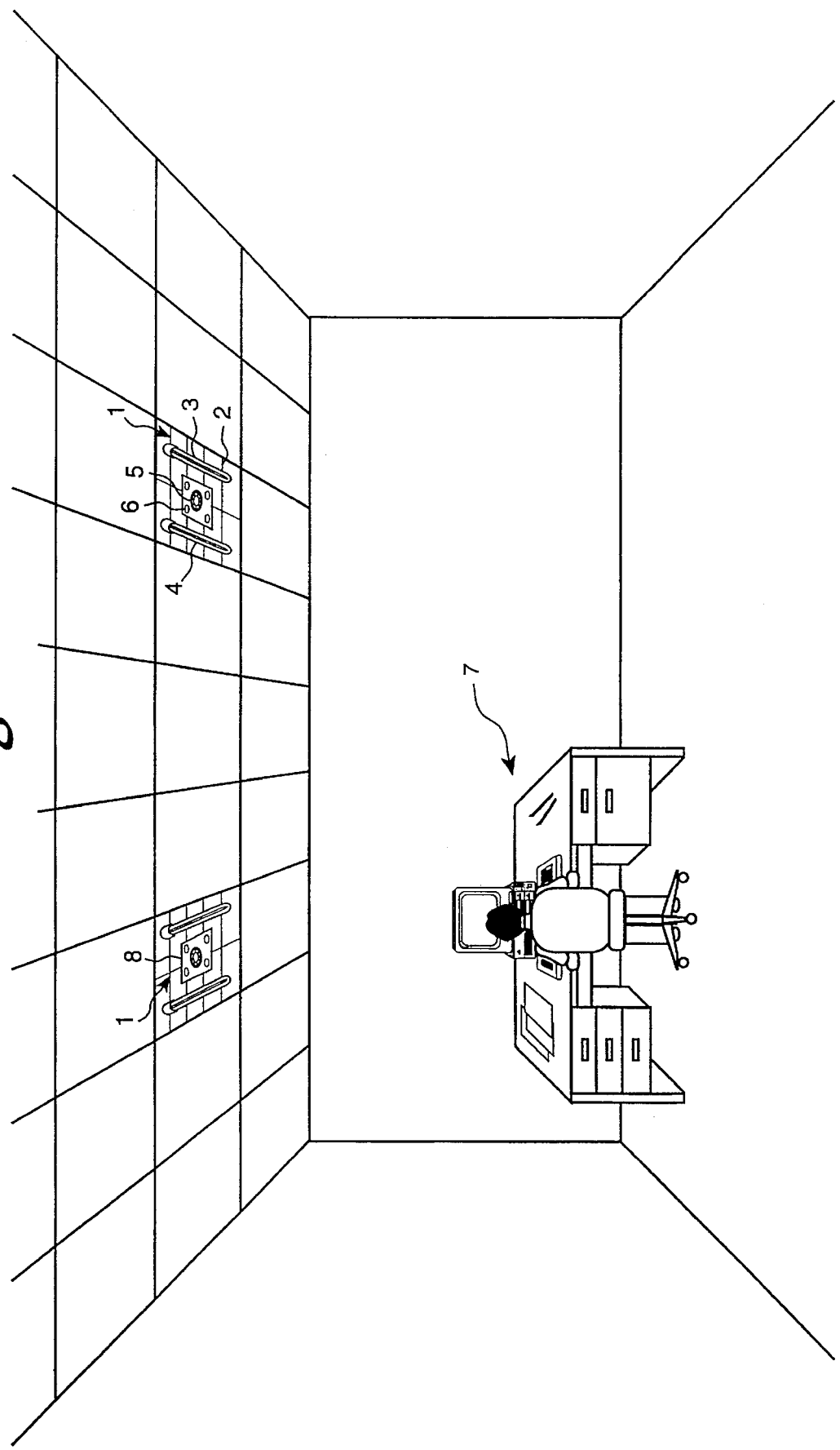
FIG. 1 is a schematic overview of a lamp fitting in use in accordance with one embodiment of the invention.

Referring to FIG. 1, a pair of lamp fittings 1 are shown installed in a ceiling of an office. The ceiling is typically between 2.4 and 2.7 meters high and the spacing between the centers of the lamp fittings 1 is typically 2.4 to 3.0 meters. Each of the lamp fittings 1 is designed, in accordance with an embodiment of the invention, as an intelligent luminaire by which is meant that it incorporates a lighting control system that automatically adjusts its output to maintain a constant illumination onto a desk only when an occupant is within its operation range. Each luminaire consists of a self-contained 600 by 600 mm recessed unit with a 16 cell low brightness aluminum reflector optic 2 suitable for VDU screen usage. The luminaire is fitted with energy efficient twin 40W 2L fluorescent lamps 3,4 the output of which is reflected by the reflector optic 2 to desired areas 7, only one of which is shown in FIG. 1.

Figure 2:
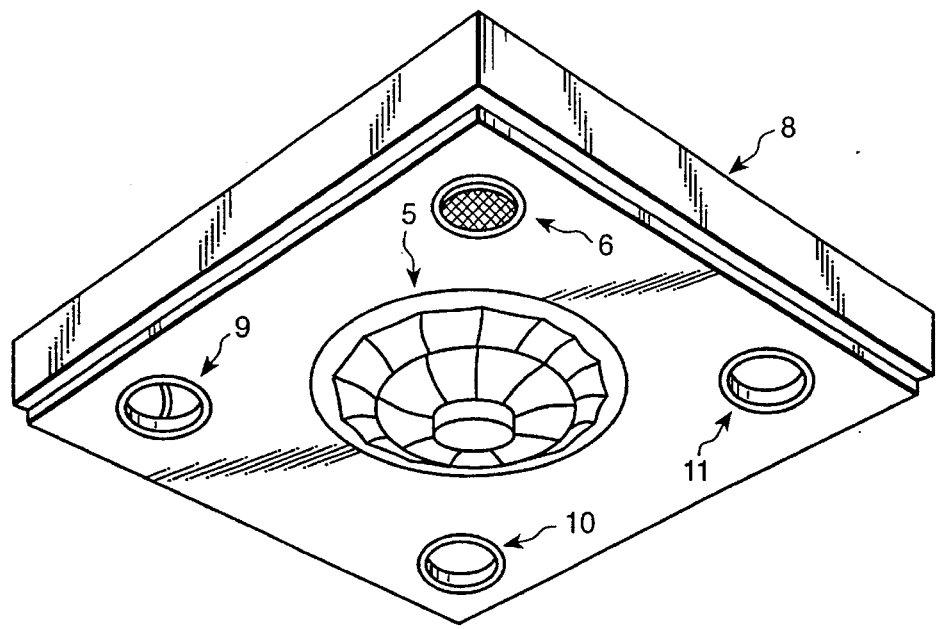
FIG. 2 shows in enlarged detail one of the components of the lamp fitting of FIG. 1.
Figure 3:
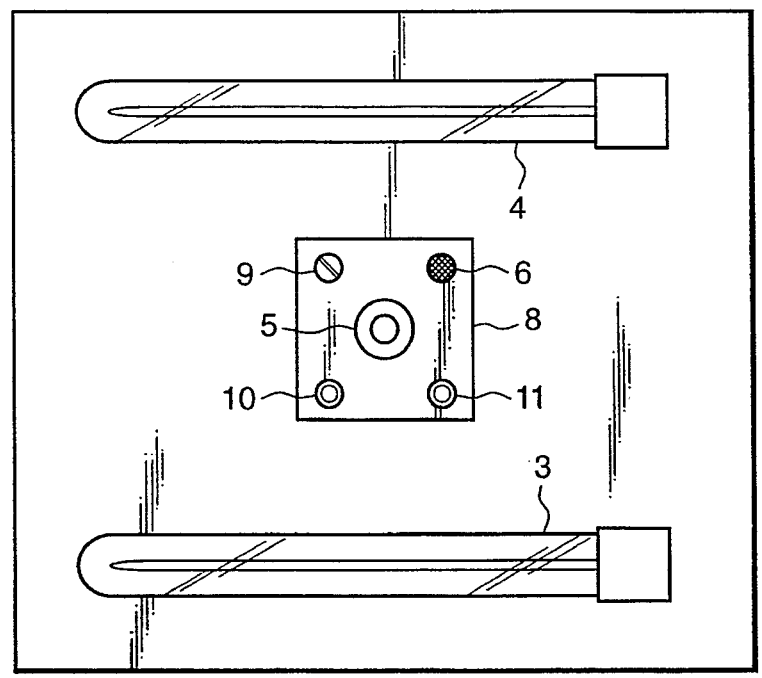
FIG. 3 is a layout of the fitting as seen from below.

In the center of the reflector optic 2 is mounted a central control plate 8, see FIGS. 2 and 3, in which is mounted a passive infra-red presence detector 5 that brightens up the luminaire when a person is in the response area. The control plate 8 is also provided with a photocell 6 for detecting the light level in the operation range, a rotary switch 9 for adjusting the maximum output of the lamps 3,4 and two further locations 10,11 which can be used for mounting additional sensors, indicators or emergency lighting. The luminaire is connected to a lighting ring power supply and requires no other control or switching elements.

Figure 4:
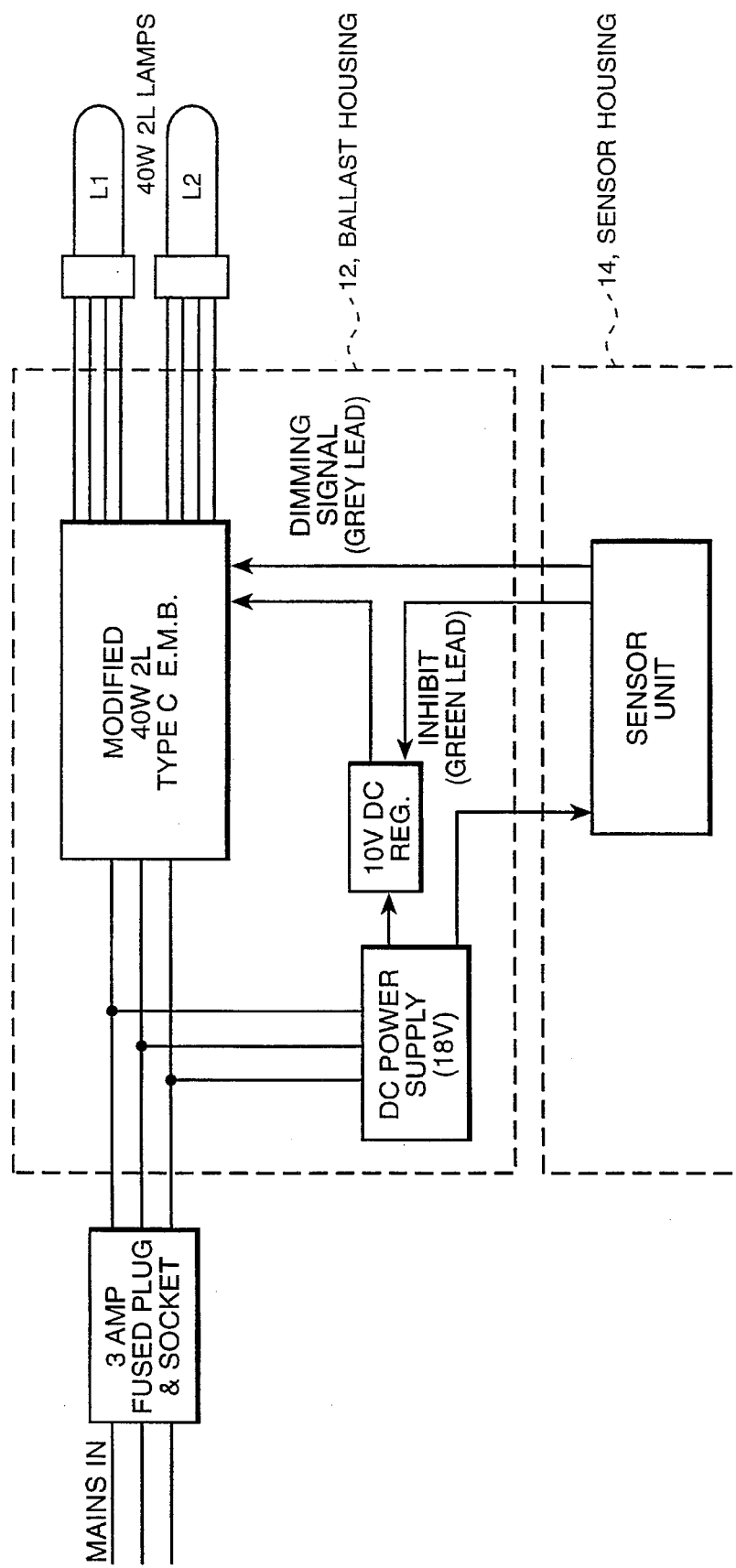
FIG. 4 is a block schematic diagram of the circuit incorporated in the fitting.

FIG. 4 shows in block diagram form the overall luminaire control circuit which is split into two distinct parts, namely a ballast housing 12 and a sensor housing 14. The sensor housing 14 contains a control pcb incorporating passive infra-red (PIR) and photocell detection circuits, while the ballast housing 12 contains a 40W 2L Type C Electronic Mains Ballast (EMB) as well as a low voltage power supply (LVPS). The sensor unit can both 'dim' and turn 'on' and 'off' the ballast in accordance with a given stimulus such as ambient conditions and/or personnel detection.

The luminaire control circuit is designed to be connected to the mains supply (220 V/240 V AC rms) at all times and is not subject to switch drops. The circuit is double protected via an external three amp fuse in the mains plug and socket, as well as a 2.7 amp internal fuse in the ballast housing 12. The circuit will light the lamps L1, L2 only if a person is detected by the PIR as being within viewing range and if the light received back at the photocell detector is below a set regulating level, i.e., a "turn-on" light level. In this case, since the lamps are initially off, the turn-on light level is the level of light received at the photocell detector from sources other than the lamps under control. The light level will be adjusted automatically to hold the working illuminance at a constant level, i.e., a "target" light level, irrespective of any changes in the ambient contribution from sources other than the lamps under control, such as windows, etc.

If ambient light conditions become very high the EMB is capable of dimming down the lamp power. Should the ambient conditions lead to the light level viewed by the photocell exceeding a threshold value, i.e., a "turn-off" light level, for example, twice the set regulating level or turn-on light level, then the circuit will switch off after a predetermined period, for example fifteen minutes, after its last detection. To allow the circuit to start the lamps L1,L2 again the light level of the photocell detector must fall below the regulating turn-on light level. Should the person leave the detection area at any time the circuit will automatically turn off after a set period, for example fifteen minutes, after its last detection.

The dimming function is achieved by varying a port on a Custom Control I.C. between three and five volts (five volts full power) using a grey sensor control lead. The on/off functionality is achieved by switching the low voltage supply to the control circuits of the EMB via an inhibit signal to a regulator using a green sensor lead.

In the preferred embodiment, two time delays are included to advantageously achieve the objects of the invention. In general, the first delay prevents the lamp output from being immediately decreased when a person leaves the area, and the second delay prevents the lamp output from being immediately decreased when the ambient light level exceeds a maximum desired level. It should be noted that this aspect of the present invention is previously discussed two paragraphs earlier wherein a first period of delay is discussed in reference to the ambient light conditions and another period of delay is discussed in reference to the exit of a person from the detecting area.

Figure 5:
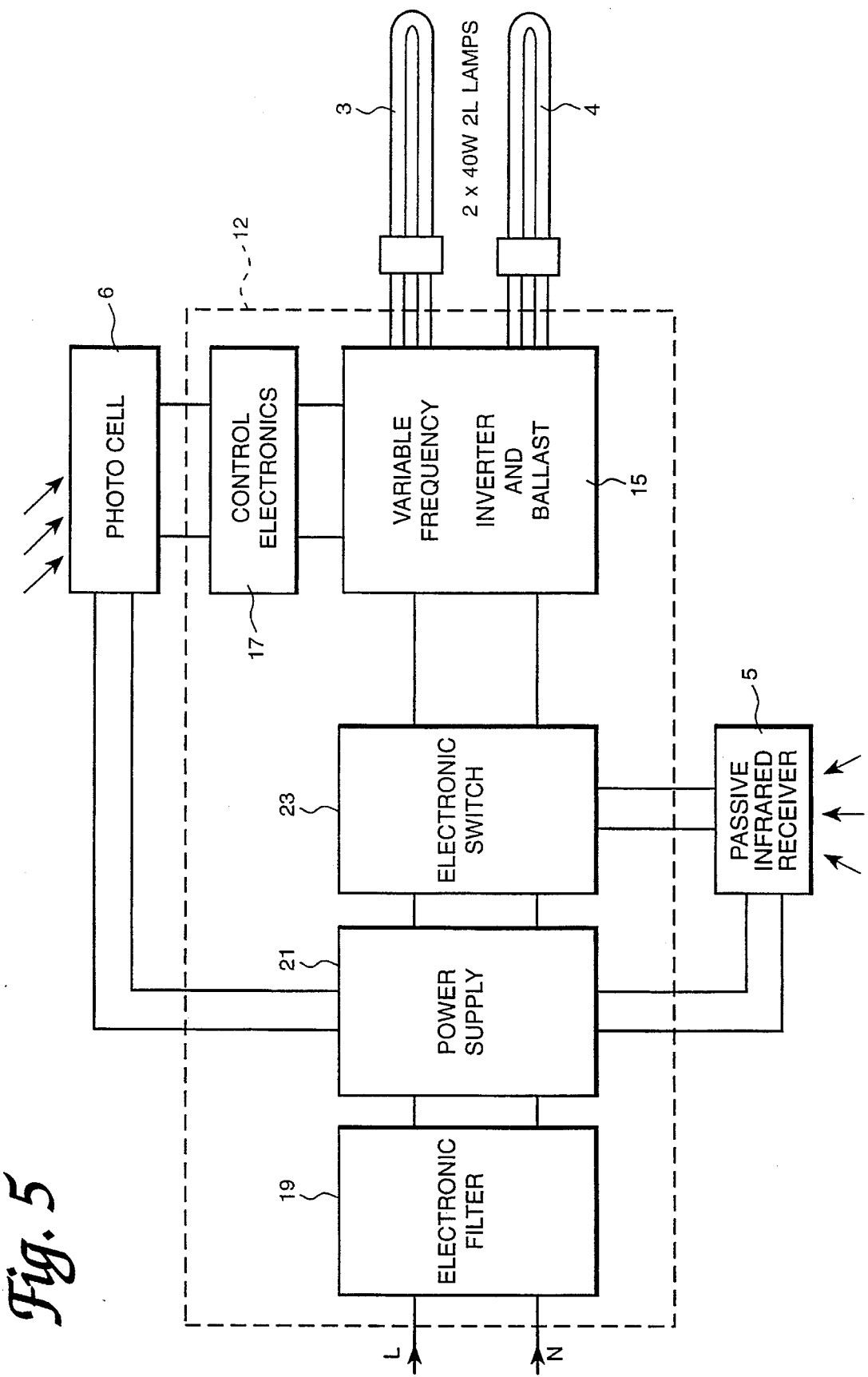
FIG. 5 is a further block schematic diagram of the circuit.

FIG. 5 shows in block form an overall luminaire control circuit with particular reference to the embodiment of FIGS. 1 to 3. In this embodiment, the two 40W 2L lamps 3,4 are shown connected to a variable frequency electronic ballast 15. The ballast 15 has a DC level part into which the output of the photocell 6 is fed via suitable control electronics 17.

The incoming mains is connected via an electronic filter 19 to a power supply unit 21 including a six part relay which is in turn connected to the infra-red detector 5. The output of the IR detector controls the ballast circuit 15 via an electronic switch 23. The output of the lamps 3,4 is also controlled by the radial distribution reflector optic 2. The two detectors 5,6 are set in the trim of the reflector optic 2 or into a channel within the optic 2 separating the two lamps 3,4.

In the embodiment shown in FIG. 5, if the PIR 5 detects a person as being within its viewing range and the light level sensed is below the turn-on light level, the electronic switch 23 will activate the lamp output to an appropriate light level as discussed above. If the lamps are on and the PIR 5 detects that all persons have left the viewing range, the electronic switch 23 prevents the lamp output from immediately being decreased (e.g., turned off). A predetermined amount of time is allowed to pass before the lamp output is decreased. If a person returns before the expiration of that predetermined amount of time, the lamp output will of course not be decreased. This operation provides the advantage that if a person leaves the viewing area for only a short period of time and then returns, the lamps will not rapidly change output levels in an annoying fashion. Preferably, that predetermined amount of time is 10 to 15 minutes. Of course, that amount of time could be adjusted to accommodate the usage of the area being lit and the likelihood and frequency that persons will exit and return to that area.

A second delay in decreasing the lamp output is provided by the photocell 6 and the control electronics 17. As discussed above, the control electronics 17 receives a signal from the photocell 6 indicating the level of light that is presently being detected. If the level of light increases beyond a maximum desired level, the lamp output is not immediately decreased. In particular, if the photocell 6 receives a level of light above the turn-off level, the control electronics 17 delays a predetermined amount of time before decreasing the lamp output. After that predetermined amount of time has passed, preferably 2 to 10 minutes, the control electronics provides an appropriate signal to the inverter and ballast 15 to extinguish the lamps. In a more preferred embodiment, the level of light is sensed continuously throughout the second delay period to insure that the turn-off level has been consistently exceeded. The second delay stabilizes the system response by preventing the lamps from turning on and off in a rapid and annoying fashion, such as could occur in response to a lightning flash or other short bright burst of light.

It should be understood that the above-described first and second delays are preferably introduced only when the lamps are on. If the lamps are off and a person is present, for example when the light level sensed by the photocell is high, e.g., above the turn-on level, a different control scheme is preferably used. In that instance, the control electronics immediately increases the lamp output to provide an acceptable level of light (i.e., turns the light on) when the photocell 6 indicates the level of light has fallen below a minimum desired level, such as the turn-on level. This feature prevents a user from being plunged unexpectedly into darkness by, for example, someone closing a window blind, or a thundercloud passing in front of the sun.

It should also be understood that alternate embodiments of the present invention may variously decrease the lamp intensity to a dim condition or a dark (i.e., off) condition when the turn-off light level is exceeded, depending upon the lighting needs. If the system decreases the lamp intensity to a dim condition (i.e., non-off) upon sensing a light level greater than the turn-off light level, the system provides some light level in addition to that from other sources whenever a presence is detected. Of course, when no presence is detected for a predetermined amount of time, the preferred lamp condition is off.

Another aspect of the present invention relates to the control scheme in the situation where the lamps are on and the level of light sensed by the photocell is less than the turn-off level. In the preferred embodiment, the control electronics 17 preferably adjusts the lamp output to maintain the light level as constant as practicable at a target light level. For example, if the level of light sensed by the photocell slightly decreases, the control electronics 17 would slightly increase the lamp output a corresponding amount to maintain the target light level. Alternatively, if the level of light sensed by the photocell slightly increases, the control electronics 17 would slightly decrease the lamp output a corresponding amount to maintain the target light level. This control scheme accordingly varies the lamp output between a minimum and maximum level as dictated by the ambient light provided by sources other than the lamps under control. In the preferred embodiment, the lamp output may be varied between 25% and 100% of the maximum light output. Of course, it should be understood that the range of lamp output, as well as the target light level, can be selected according to the expected ambient light fluctuations in the environment in which the present invention is installed, and also according to the intended use of that environment and its lighting requirements.

Figure 6B:
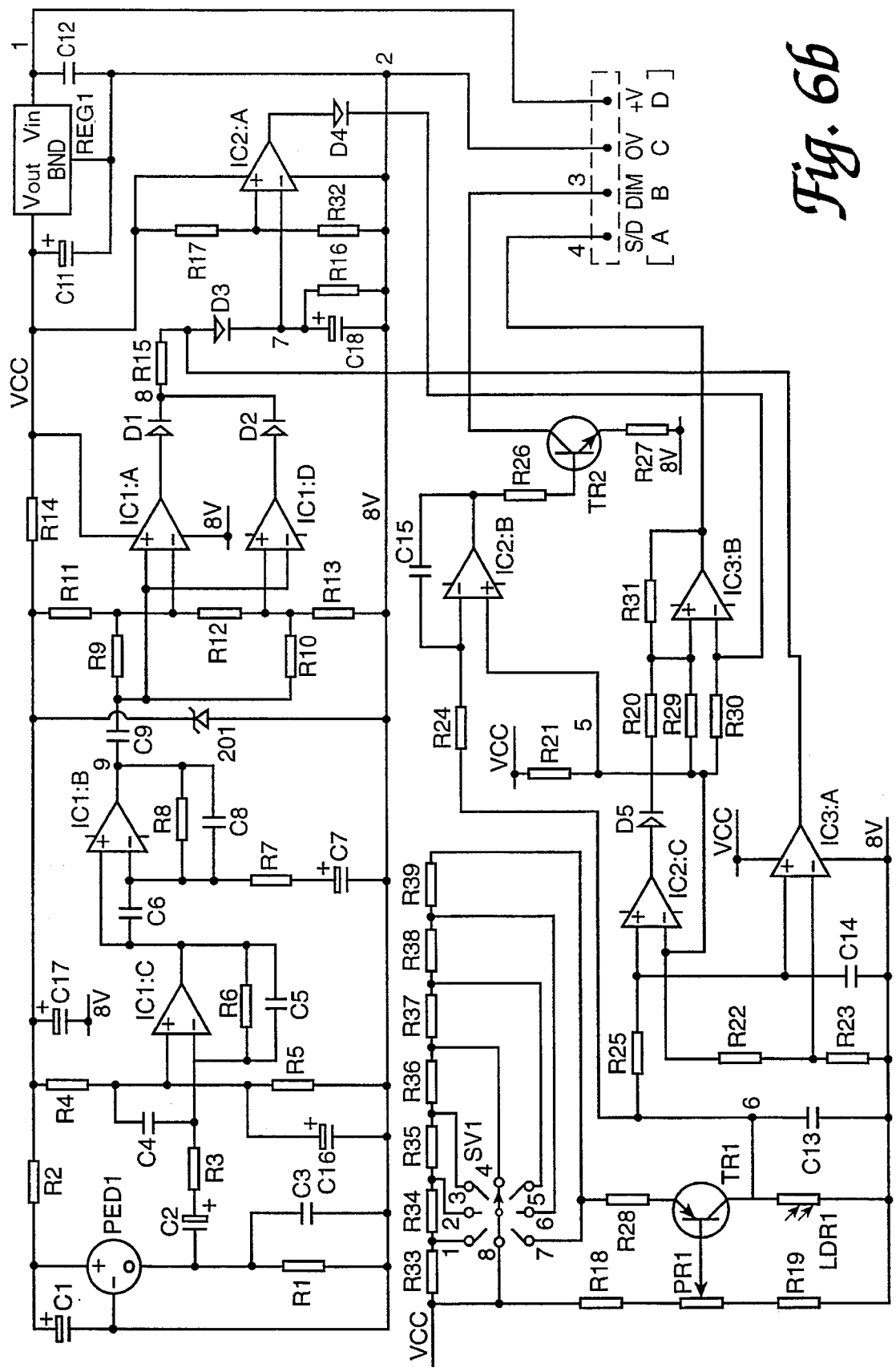

FIGS. 6a and 6b show a specific implementation of a preferred embodiment. FIG. 6a illustrates the basic circuitry for the Electronic Mains Ballast (EMB) and Low Voltage Power Supply (LVPS). The layout shown is with relation to a hybrid layout where the control circuitry is held on a single ceramic hybrid. Much of the detail of the operation of the ballast is well known in the art and thus only a brief description of its major components is set out below.

An input RFI filter circuit is provided which in FIG. 6a comprises a set of capacitors C1, C2, C3, and C4 together with chokes L1, L2 and the output from the filter circuit is coupled to a bridge rectifier comprising diodes D1–D4 to provide a.c. to d.c. conversion. A preregulator is incorporated to produce a sinusoidal input current to the required harmonic limits while at the same time producing unity power factor and a constant 375 V DC supply on a reservoir capacitor C6, irrespective of the load (100% to 25% lamp power). A high frequency inverter stage is coupled to the preregulator and includes drive circuitry for a pair of bridge transistors TR4 and TR5. Conventional lamp ballasting and cathode heating circuitry is provided designed to produce the correct preheat and prestrike characteristic as well as running conditions for the lamps in conjunction with the ballast control circuits. In addition, control circuitry and logic is provided to control starting and running of the lamps as well as assessing fault conditions such as lamps missing or deactivated, low reservoir capacitor voltages, or a low control supply voltage. The last of these conditions is important in the operation of the lamp fitting in the embodiment in that if the 10 V DC supply to the control circuits drops below 8.5 V DC, the ballast automatically stops the inverter, turning the lamps off. This is similar to the manner in which the lamp fitting turns its lamps on and off by switching the low voltage supply between 10 V DC and 1.2 V DC.

The circuit embodiment of FIG. 6a includes further features to those normally found in a conventional ballast. There is provided a neon indicator N1 to identify to service engineers and electricians that mains supply is still connected to the fitting even though the lamps may be out. A switch SW100 is provided which limits the maximum voltage that can be applied to the dim port between 4 V DC and 5 V DC. In this way, one can limit the maximum lamp power (i.e., the upper limit) from between 75% and 100%. Thus, one can simulate the use of 36W 2L lamps instead of 40W 2L lamps for installations where ceiling spacing of fittings is small and high maximum illuminances are measured. A surge arrestor SA100 is used to avoid transients on the main from causing an over voltage on C6, the main reservoir capacitor. This is an important feature since the lamp fitting will remain connected to the main even in an unloaded state. This arrestor also allows the circuit to pass the mains transient test procedures, which are necessary to acquire VDE approvals.

A major feature which distinguishes the circuitry of FIG. 6a over conventional ballast circuitry is the use made of a low voltage supply generated via a transformer T101, diodes D101–D104 and a capacitor C100. This low voltage supply is both used to generate 10 V DC supply via regulator REG1 as well as to generate a DC supply of between 14 V and 31 V, dependent on mains level, for the sensor module. The ballast housing has three main leads with associated plug and socket, eight lamp leads with 2 L lamp holders and four signal leads for connection to the sensor module, two for the DC power supply discussed above and two for dimming and turning the ballast 'on' and 'off'.

FIG. 6b illustrates the circuitry used to control the ballast described above with the terminals A, B, C, D connected to the corresponding lettered terminals of FIG. 6a. The circuitry of FIG. 6b may be considered in three distinct parts, namely, the power supply, the PIR detector circuit, and the photocell and light level latches.

The power supply is provided from the raw supply from the ballast circuit (14–31 V DC) which is double regulated via a chip regulator circuit (SV DC) and a resistor/zener regulator (6.2 V DC). This prevents any drop in load or noise from affecting the rails in the sensor and in particular the high gain amplifier which could result in retrigger. The most likely cause of such a load drop is when the ballast turns off.

The PIR detector circuit forms the top part of the circuit of FIG. 6b and is itself subdivided into four distinct parts, described as follows:

1. The passive infra-red detector PED1 is located at the focal point of a Fresnel lens system which focusses infra-red radiation onto its active elements thereby generating an output signal when a person moves into the viewing area of the fitting which at normal ceiling heights (2.8 m) is a circle of radius 2.5 meters. The device must be mounted accurately with respect to the lens system otherwise the sensitivity of the device as well as its viewing area may be affected. It must likewise be protected during handling and soldering as well as from draughts across its body during operation. The signal output of the sensor when someone moves across the viewing area is typically an AC signal with a frequency between 0.5 and 5 Hz.

2. A high gain band pass amplifier is provided including operational amplifiers C and D which are used to amplify the useful detection signals. The band pass range is between 0.5 and 5 Hz approximately with a peak gain at 1.5 Hz of 67 bB (approximately 2000 times). The amplifier includes an inverting section 1C1:C and a non inverting section 1C1:B. The signal is superimposed onto a DC level set by R4 and R5 at half rail (approximately 3 V DC). The signal will be inverted by the first stage of gain. However, since there are both positive and negative threshold detectors, this is of little consequence and produces a summing point for either dual or quad element PIR detectors to improve sensitivity. Due to high value resistors and capacitors, the amplifier requires a one minute setting period after mains application.

3. A window comparator is provided in which the amplified signal and some spurious background noise are AC coupled via C9 into a threshold detector. The resistors R9 and R10 set the AC signal accurately to the mid point of the window which is 320 mV wide at plus or minus 160 mV. Thus a signal exceeding these levels will trigger either 1C1:A or 1C1:D. This triggering of the A and D amplifiers charges C10 via R15 to approximately 6 V. The capacitor C10 is 100 uf and is in parallel with a 1 MΩ discharge resistor, thus giving approximately a fifteen minute discharge period. The capacitor voltage is one of the inputs to the timer latch.

4. An operational amplifier 1C2:A forms an integral part of the timer circuits. The main timing capacitor C10 forms one input while the non inverting input is set by R17 and R32 to about 0.2 V. Thus, on charging the capacitor the output of this amplifier goes low allowing the shut-down latch 1C3:B to be acted upon by the light level circuitry. Once discharged to below 0.2 V, 1C2:A output is driven high forcing 1C3:B inverting input high and resulting in the shutdown latch having a low output which when connected to the 'Adjust' terminal of the ballast regulator (REG 1), turns off the 10 V DC supply. The lamps thus extinguish.

The photocell and light level latches will now be described. A transistor TR1 and a switch SW1, together with their associated resistors form a switchable constant current generator, switch SW1 is factory preset to position 4 where the circuit will attempt to achieve a regulating light level of some 120 LUX, i.e., a preferred target light level. The current is applied to a light dependent resistor (LDR1) which yields a voltage related to light level on the device. This voltage is input to an error amplifier/integrator formed by 1C2:B the output of which controls TR2 producing a voltage on the dim wire D (grey lead) of between 3 V and 5 V (5 V full power). The resistors R27 on the sensor and R24 on the ballast (FIG. 6a) set the minimum level at 3 V while R102 on the ballast limits the maximum DC voltage to 4 V instead of 5 V which reduces maximum lamp power with the use of switch SW100.

The net effect of the above variation in dim voltage is to adjust lamp output until the voltage across the LDR1 equals that reference voltage produced across R22 and R23. Once achieved, the circuit is said to be under stable conditions and will maintain the target light level. Any increase in ambient conditions reduces LDR 1 output and increases the drive on the base of TR2, thus reducing the dim output voltage and dimming the lamps. A reduction in ambient light has an opposite effect, with the speed of response in both cases depending upon the size of the error at the integrator.

In this specific embodiment, the ballast is only capable of dimming to 25% lamp power, beyond which no further compensation as described above can take place. Thus, if ambient light continues to increase, the LDR voltage will fall until it is below the reference at the node between R22 and R23. Once this occurs, 1C3:A clamps the output of the threshold detectors low, resulting in no further personnel detection. Once any residual charge has been removed from C10 via R16, the circuit will clamp the shutdown S/D output low, switching the lamps off.

To re-establish the lamps in the preferred embodiment, it is not sufficient to reduce the ambient such that the second threshold, i.e., the turn-off light level, is exceeded since although this will allow 1C3:A output to be released, the circuit is configured in such a way as not to reset the S/D latch 1C3:B. To achieve a high output on 1C3:B, one must actively force it high by reducing the ambient to below the set regulating level, i.e., the turn-on light level (typically set at 120 Lux). This allows 1C2:C to force the S/D latch output high and re-establish running of the lamps.

As is clear from the above description, the preferred embodiment uses a turn-off light level which is higher than the turn-on light level. It should be understood that the invention, in its broader aspects, is not so limited in that the turn-off light level and the turn-on light level can be selected as desired by the appropriate modifications to the above described circuitry.

The switchable constant current source is required to allow for different room reflectance conditions. If the room is primarily lightly colored, more light can be received back at the LDR causing dimming even though one may be requiring the ballast to run at full power (e.g., in night time conditions). Thus, by switching to a high current from the source, one increases the LDR voltage allowing lamp power to increase.

The luminaire described above will only come on when there is a human being within its effective area and will increase illuminance automatically as daylight fades. This self managed luminaire requires no switch drops and is suitable for small private or large open area lighting. It provides very high energy savings (60–80%), tremendous flexibility for space planning as no control wires are needed and no additional signals are required to activate the luminaire.

I claim:

1. A method of controlling the illumination of a localized area by a light source in a self-contained light fitting proximally located to said localized area, comprising the steps of:

sensing from the fitting for the presence of a living being, such as a person, in the localized area;

sensing from the fitting the light intensity in said localized area; and automatically controlling said light source by:
switching said light source from a first low luminous condition to a high luminous condition when a presence is sensed in the localized area and the sensed light intensity in the localized area is less than a predetermined turn-on intensity;

adjusting said light source when in the high luminous condition between minimum and maximum light output levels in response to the light intensity sensed in said localized area to maintain a substantially constant target light intensity in the localized area; and switching said light source from the high to the first low luminous condition when no presence is sensed in said localized area for a first predetermined amount of time, or to a second low luminous condition when the sensed light intensity increases to at least a predetermined turn-off intensity for a second predetermined amount of time of at least about two minutes.

2. The method of claim 1, wherein said turn-off intensity is greater than said turn-on intensity.

3. The method of claim 1, wherein the localized area is approximately centered beneath the light fitting.

4. The method of claim 1, wherein the maximum light output level corresponds to a full power light output and the minimum light output level corresponds to 25% of the full power light output.

5. The method of claim 1, further comprising the step of selecting the maximum light output level from a range of between 75% and 100% of a full power light output 6. The method of claim 1, wherein said first predetermined amount of time is between 10 and 15 minutes, and said second predetermined amount of time is between 2 and 10 minutes.

7. The method of claim 1, wherein said first and second low luminous conditions both correspond to the light source being in an off condition.

8. The method of claim 1, wherein said first luminous condition corresponds to the light source being in an off condition, and said second low luminous condition corresponds to the light source being in a dim condition.

9. A method of controlling illuminations to a plurality of localized areas in an open space, wherein a plurality of light sources each in a self-contained light fitting are each associated with a distinct one of said localized areas, and each light source illuminates its associated localized area, wherein the illumination by each light source is controlled according to the method of claim 1.

10. A self-contained lamp fitting including a dimmable light source, a power supply, and an automatic control device for controlling the light output from said light source to a localized area proximally associated with the lamp fitting, in which the automatic control device comprises:
   (a) a presence detector operable for detecting the presence of a living being, such as a person, in the localized area and outputting a presence signal indicative of said presence;
   (b) a light detector operable for detecting light intensity levels in the localized area and outputting an intensity level signal indicative of a detected light intensity level;
   (c) dimming means connected to the presence detector and light detector, and switchingly connected between the power source and the light source, said dimming means comprising:
      (i) means for switching the light source from a first low luminous condition to a high luminous condition when receiving both the presence signal from the presence detector and a light intensity level signal from the light detector indicative of a light intensity less than a predetermined turn-on light intensity level; and
      (ii) means for switching the light source from the high luminous condition to the first low luminous condition in response to a signal from the presence detector indicating the absence of a person for a first predetermined period of time, or to a second low luminous condition in response to a signal from the light detector indicative of a light intensity of at least a predetermined turnoff reference level for a second predetermined period of time of at least about two minutes.

11. The lamp fitting of claim 10, wherein the dimming circuit further comprises means for adjusting the light output from the light source between a maximum output level and a minimum output level in response to the signal from the light detector to maintain a substantially constant light level by adjusting the light output within the minimum and maximum output levels.

12. The lamp fitting of claim 10, wherein the maximum light output level corresponds to a full power light output and the minimum light output level corresponds to 25% of the full power light output.

13. The lamp fitting of claim 10, further comprising means for selecting the maximum light output level from a range of between 75% and 100% of a full power light output.

14. The lamp fitting of claim 13, wherein said means for selecting comprises a switch.

15. The lamp fitting of claim 10, wherein the dimming means further comprises a timer means connected to said presence detector and said light detector for generating said first and second predetermined periods of time before switching the light source from said high luminous condition to said low luminous condition.

16. The lamp fitting of claim 10, wherein said turn-off reference level is greater than said turn-on reference level.

17. The lamp fitting of claim 10, wherein the localized area is approximately centered beneath the light fitting.

18. The lamp fitting of claim 10, wherein said dimming means includes a dimmable electronic ballast electrically coupled to the light source, and coupled to the presence detector and light detector to provide a power supply to drive the presence detector and light detector.

19. The lamp fitting of claim 10, further comprising a control plate centrally located in the lamp fitting, wherein the dimming means, the presence detector, and light detector are mounted on the control plate.

20. The lamp fitting of claim 10, wherein the presence detector comprises a passive infra-red detection device and the light detector comprises a photoresponsive device.

21. The lamp fitting of claim 10, wherein said first predetermined period of time is between 10 and 15 minutes, and said second predetermined period of time is between 2 and 10 minutes.

22. The lamp fitting of claim 10 wherein said first and second low luminous conditions both correspond to the light source being in an off condition.

23. The lamp fitting of claim 11, wherein said first luminous condition corresponds to the light source being in an off condition, and said second low luminous condition corresponds to the light source being in a dim condition.

24. A plurality of self-contained lamp fittings in an open space, each fitting including a light source, a power supply, and an automatic control device according to claim 10, wherein for each lamp fitting the automatic control device is operable to control light output from the light source in a localized area associated with the lamp fitting, each lamp fitting having a different associated localized area.

25. The plurality of self-contained lamp fittings in an open space according to claim 24, wherein each associated localized area is nonoverlapping with adjacent associated localized areas.

26. An automatic control device for use in a self-contained lamp fitting including a dimmable light source for controlling the light output from a light source to a localized area associated with the lamp fitting, comprising:
   (a) presence detector means for detecting the presence of a living being, such as a person, in the localized area and outputting a presence signal indicative of whether a is detected;
   (b) light detector means for detecting a light intensity level in the localized area and outputting an intensity level signal indicative of the detected light intensity level;
   (c) dimming means connected to the presence detector, the light detector, and the light source for automatically controlling the light source using the presence signal and the intensity level signal by:
   maintaining said light source in a first low luminous condition when either a presence signal indicative of no detected presence is received by the dimming means, or when an intensity level signal indicative of a detected light intensity level of at least a predetermined turn-on reference level is received by the dimming means;

switching said light source from the first low to a high luminous condition in response to a presence signal indicative of a detected presence and an intensity level signal indicative of a detected light intensity level less than the predetermined turn-on reference level, and maintaining a substantially constant light intensity in said localized area by adjusting said light source between a minimum and a maximum light output level in dependence on the intensity level signal; and switching said light source from the high to the first low luminous condition in response to a presence signal indicative of no detected presence for a first predetermined period of time, or to a second low luminous condition in response to an intensity level signal indicative of a detected light intensity level of at least a predetermined turn-off reference level for a second predetermined period of time of at least about two minutes.

27. The automatic control device of claim 26, wherein said turn-off reference level is greater than said turn-on reference level.

28. An integrated array of individual self-contained light fittings in a room comprising workspaces, each fitting proximally associated with an individual workspace, each fitting comprising a dimmable light source, a power supply, and an automatic control device for controlling the light output from each individual fitting, wherein each automatic control device comprises:

(a) a presence detector operable for detecting the presence of a person in the associated workspace but not any adjacent workspace, and outputting a presence signal indicative of said presence;

(b) a light detector operable for detecting light intensity levels in the associated workspace and outputting an intensity level signal indicative of a detected light intensity level;

(c) a dimming circuit connected to the presence detector and light detector and switchingly connected between the power source and the light source, said dimming circuit being operable (i) to switch the light source from a low luminous condition to a high luminous condition when receiving both the presence signal and a light intensity signal indicative of a light intensity below a predetermined minimum level, and to maintain a substantially constant light level at the associated workspace by adjusting the light output within a minimum output level and a maximum output level in dependence on the intensity level signal; and (ii) to switch the light source from the high luminous condition to the low luminous condition in response to either (1) a signal indicating the absence of a worker in the associated workspace for a first predetermined period of time, or (2) an intensity level signal indicative of a light intensity in the associated workspace of at least a predetermined maximum reference level for a second predetermined period of time of at least about two minutes.

29. The automatic control device of claim 26, wherein the maximum light output level corresponds to a full power light output and the minimum light output level corresponds to 25% of the full power light output.

30. The automatic control device of claim 26, further comprising means for selecting the maximum light output level from a range of between 75% and 100% of a full power light output.

31. The automatic control device of claim 26, wherein the dimming means further comprises a timer means connected to said presence detector and said light detector for generating said first and second predetermined periods of time before switching the light source from said high luminous condition to said low luminous condition.

32. The automatic control device of claim 26, wherein said dimming means includes a dimmable electronic ballast electrically coupled to the light source, and coupled to the presence detector and light detector to provide a power supply to drive the presence detector and light detector.

33. The automatic control device of claim 26, further comprising an indicator means for indicating that the lamp fitting is connected to a mains power supply while said light source is in the low luminous condition.

34. The automatic control device of claim 26, wherein the presence detector means is a passive infra-red detection device and the light detector means is a photoresponsive device.

35. The automatic control device of claim 26, wherein the light detector means is adapted for detecting light intensity levels of a work surface spaced above the floor in the localized area, and the dimming means is adapted for adjusting the light source to maintain a constant light intensity level from the work surface while the light source is in the high luminous condition.

36. The automatic control device of claim 26, wherein said first predetermined period of time is between 10 and 15 minutes, and said second predetermined period of time is between 2 and 10 minutes.

37. The automatic control device of claim 26, wherein said first and second low luminous conditions both correspond to the light source being in an off condition.

38. The automatic control device of claim 26, wherein said first luminous condition corresponds to the light source being in an off condition, and said second low luminous condition corresponds to the light source being in a dim condition.

39. A plurality of self-contained lamp fittings in an open space, each fitting including a light source, a power supply, and an automatic control device according to claim 26, wherein for each lamp fitting the automatic control device is operable to control the light output from the light source in a localized area associated with the lamp fitting, each lamp fitting having a separate associated localized area.

40. A method of controlling the illumination of a plurality of workspaces in a room by means of an integrated array of light sources in individual self-contained light fittings, each fitting proximally associated with each workspace, comprising the steps of:

(a) sensing from each fitting for the presence of a person in the workspace associated with the fitting;

(b) further sensing from each fitting the light intensity in the workspace associated with the fitting; and (c) controlling lighting within the array automatically at each individual fitting by—

(i) maintaining each light source in a low luminous condition when either (1) no presence is sensed in the associated workspace, or (2) a presence is sensed and the sensed light intensity meets or exceeds a predetermined minimum reference level;

(ii) switching each light source from the low luminous condition to a high luminous condition when both (1) a presence is sensed in the associated workspace, and (2) the sensed light intensity is less than the predetermined minimum reference level, and then adjusting said light source between a minimum and a maximum light output level in dependence on the light intensity sensed in the workspace to maintain a substantially constant sensed light intensity; and (iii) switching each light source from the high luminous condition to the low luminous condition when either (1) no presence is sensed in the associated workspace for a first predetermined amount of time, or (2) the sensed light intensity increases to greater than a predetermined maximum reference level for a second predetermined period of time of at least about two minutes.

41. An automatic control device for controlling the light output from an integratable array of self-contained lamp fittings to individual workspaces proximally associated with each lamp fitting, each fitting including a dimmable light source and a power supply, each control device comprising:

(a) a presence detector for detecting a person in the associated workspace but not any adjacent workspace, and outputting a presence signal indicative of whether a presence is detected;

(b) a light detector for detecting light intensity levels in the associated workspace and outputting an intensity level signal indicative of a detected light intensity level;

(c) dimming means connected to the presence detector, the light detector, the light source, and the power supply for automatically controlling the light source using the presence signal and intensity level signal by:

maintaining the light source in a low luminous condition when either the presence signal indicates no detected presence, or when the intensity level signal indicates a light intensity of at least a predetermined minimum reference level;

switching the light source from the low luminous condition to a high luminous condition in response to a presence signal indicating a detected presence and an intensity level signal indicating a light intensity less than the predetermined minimum reference level, and maintaining a substantially constant light intensity at the associated workspace by adjusting the light source between a minimum and a maximum light output level in dependence on the intensity level signal; and switching said light source from the high luminous condition to the low luminous condition in response to either a presence signal indicating no detected presence in the associated workspace for a first predetermined period of time, or in response to an intensity level signal indicating a light intensity of at least a predetermined maximum reference level for a second predetermined period of time of at least about two minutes.

42. A method of controlling the illumination of a localized area by a light source in a self-contained light fitting proximally located to said localized area, comprising the steps of:

sensing from the fitting for the presence of a living being, such as a person, in the localized area;

sensing from the fitting the light intensity in said localized area; and automatically controlling said light source by:

switching said light source from a first low luminous condition wherein said light source is in an off condition to a high luminous condition when a presence is sensed in the localized area and the sensed light intensity in the localized area is less than a predetermined turn-on intensity;

adjusting said light source when in the high luminous condition between minimum and maximum light output levels in response to the light intensity sensed in said localized area to maintain a substantially constant target light intensity in the localized area; and switching said light source from the high to the first low luminous condition when no presence is sensed in said localized area for a first predetermined amount of time, or to a second low luminous condition wherein said light source is in a dim condition when the sensed light intensity increases to at least a predetermined turn-off intensity for a second predetermined amount of time.

43. A self-contained lamp fitting including a dimmable light source, a power supply, and an automatic control device for controlling the light output from said light source to a localized area proximally associated with the lamp fitting, in which the automatic control device comprises:

(a) a presence detector operable for detecting the presence of a living being, such as a person, in the localized area and outputting a presence signal indicative of said presence;

(b) a light detector operable for detecting light intensity levels in the localized area and outputting an intensity level signal indicative of a detected light intensity level;

(c) dimming means connected to the presence detector and light detector, and switchingly connected between the power source and the light source, said dimming means comprising:

(i) means for switching the light source from a first low luminous condition corresponding to the light source being in an off condition to a high luminous condition when receiving both the presence signal from the presence detector and a light intensity level signal from the light detector indicative of a light intensity less than a predetermined turn-on light intensity level;

(ii) means for switching the light source from the high luminous condition to the first low luminous condition in response to a signal from the presence detector indicating the absence of a person for a first predetermined period of time, or to a second low luminous condition corresponding to the light source being in a dim condition in response to a signal from the light detector indicative of a light intensity of at least a predetermined turn-off reference level for a second predetermined period of time; and (iii) means for adjusting the light output from the light source between a maximum output level and a minimum output level in response to the signal from the light detector to maintain a substantially constant light level by adjusting the light output within the minimum and maximum output levels.

44. An automatic control device for use in a self-contained lamp fitting including a dimmable light source for controlling the light output from a light source to a localized area associated with the lamp fitting, comprising:

(a) presence detector means for detecting the presence of a living being, such as a person, in the localized area and outputting a presence signal indicative of whether a presence is detected;

(b) light detector means for detecting a light intensity level in the localized area and outputting an intensity level signal indicative of the detected light intensity level;

(c) dimming means connected to the presence detector, the light detector, and the light source for automatically controlling the light source using the presence signal and the intensity level signal by:

maintaining said light source in a first low luminous condition corresponding to the light source being in an off condition when either a presence signal indicative of no detected presence is received by the dimming means, or when an intensity level signal indicative of a detected light intensity level of at least a predetermined turn-on reference level is received by the dimming means;

switching said light source from the first low to a high luminous condition in response to a presence signal indicative of a detected presence and an intensity level signal indicative of a detected light intensity level less than the predetermined turn-on reference level, and maintaining a substantially constant light intensity in said localized area by adjusting said light source between a minimum and a maximum light output level in dependence on the intensity level signal; and switching said light source from the high to the first low luminous condition in response to a presence signal indicative of no detected presence for a first predetermined period of time, or to a second low luminous condition corresponding to the light source being in a dim condition in response to an intensity level signal indicative of a detected light intensity level of at least a predetermined turn-off reference level for a second predetermined period of time.

* * * * *